US012204273B2

(12) United States Patent
Itabashi

(10) Patent No.: US 12,204,273 B2
(45) Date of Patent: *Jan. 21, 2025

(54) DEVELOPING CARTRIDGE HAVING A LEVER MOVABLE RELATIVE TO A CASING

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,307

(22) Filed: Nov. 10, 2023

(65) Prior Publication Data

US 2024/0077831 A1 Mar. 7, 2024

Related U.S. Application Data

(63) Continuation of application No. 17/325,813, filed on May 20, 2021, now Pat. No. 11,835,877, which is a (Continued)

(30) Foreign Application Priority Data

Mar. 26, 2019 (JP) ................................ 2019-058549

(51) Int. Cl.
*G03G 21/16* (2006.01)
*G03G 15/08* (2006.01)
*G03G 21/18* (2006.01)

(52) U.S. Cl.
CPC ..... *G03G 21/1647* (2013.01); *G03G 15/0813* (2013.01); *G03G 21/1676* (2013.01);
(Continued)

(58) Field of Classification Search
CPC .......... G03G 21/1647; G03G 21/1676; G03G 21/1821; G03G 21/1652; G03G 21/1867;
(Continued)

(56) References Cited

U.S. PATENT DOCUMENTS 7,542,701 B2 6/2009 Kweon
2006/0045564 A1 3/2006 Ahn
(Continued)

FOREIGN PATENT DOCUMENTS

CN 1940744 A 4/2007
CN 1991622 A 7/2007
(Continued)

OTHER PUBLICATIONS

Office Action issued in corresponding Japanese application 2023-104695, May 7, 2024.
(Continued)

*Primary Examiner* — Arlene Heredia
*Assistant Examiner* — Laura Roth
(74) *Attorney, Agent, or Firm* — Merchant & Gould P.C.

(57) ABSTRACT

A developing cartridge may include a casing capable of containing a developer material. A lever is movable relative to the casing between a first position and a second position, and has one end portion that functions as the point of effort, another end portion that functions as the point of application, and a cam surface that functions as a pivot point that is not directly connected to the casing. When the lever moves around the cam surface from the first position to the second position, the casing moves relative to the lever according to the movement of the lever.

9 Claims, 11 Drawing Sheets

Related U.S. Application Data continuation of application No. 16/825,435, filed on Mar. 20, 2020, now Pat. No. 11,022,931.

(52) U.S. Cl.
CPC ..... *G03G 21/1821* (2013.01); *G03G 21/1867* (2013.01); *G03G 2221/166* (2013.01)

(58) Field of Classification Search
CPC ......... G03G 21/1871; G03G 2221/163; G03G 2221/166; G03G 15/0813
See application file for complete search history.

(56) References Cited

U.S. PATENT DOCUMENTS

| | | | |
|---|---|---|---|
| 2007/0071480 | A1 | 3/2007 | Ishikawa |
| 2007/0071481 | A1 | 3/2007 | Kamimura |
| 2007/0077093 | A1 | 4/2007 | Okabe et al. |
| 2007/0147888 | A1 | 6/2007 | Igarashi et al. |
| 2007/0166070 | A1 | 7/2007 | Sato |
| 2010/0067947 | A1 | 3/2010 | Yuzawa |
| 2010/0111562 | A1 | 5/2010 | Okabe et al. |
| 2011/0236066 | A1 | 9/2011 | Takagi |
| 2012/0308259 | A1 | 12/2012 | Abe |
| 2013/0051833 | A1 | 2/2013 | Itabashi |
| 2013/0051849 | A1 | 2/2013 | Itabashi et al. |
| 2013/0251402 | A1 | 9/2013 | Yamashita et al. |
| 2016/0062309 | A1 | 3/2016 | Satomura et al. |
| 2017/0261927 | A1 | 9/2017 | Sato et al. |
| 2017/0269546 | A1 | 9/2017 | Yokoi |
| 2017/0285570 | A1 | 10/2017 | Sakata et al. |
| 2017/0336754 | A1 | 11/2017 | Itabashi |
| 2018/0095416 | A1 | 4/2018 | Nishiyama et al. |
| 2018/0299823 | A1 | 10/2018 | Uyama et al. |
| 2020/0310291 | A1 | 10/2020 | Itabashi |

FOREIGN PATENT DOCUMENTS

| | | | |
|---|---|---|---|
| CN | 201229468 | Y | 4/2009 |
| CN | 101833262 | A | 9/2010 |
| CN | 102200726 | A | 9/2011 |
| CN | 202748592 | U | 2/2013 |
| CN | 103324072 | A | 9/2013 |
| CN | 104412173 | A | 3/2015 |
| CN | 107229202 | A | 10/2017 |
| CN | 206594453 | U | 10/2017 |
| CN | 107402510 | A | 11/2017 |
| CN | 107861349 | A | 3/2018 |
| CN | 108241269 | A | 7/2018 |
| JP | 5-46019 | A | 2/1993 |
| JP | 5-281854 | A | 10/1993 |
| JP | 07234552 | A | 9/1995 |
| JP | 2003-186300 | A | 7/2003 |
| JP | 2009-58560 | A | 3/2009 |
| JP | 2010-72307 | A | 4/2010 |
| JP | 2013-54058 | A | 3/2013 |
| JP | 2015-11318 | A | 1/2015 |
| JP | 2016-51067 | A | 4/2016 |
| WO | 2014/141447 | A1 | 9/2014 |

OTHER PUBLICATIONS

International Search Report with a Written Opinion issued by the International Searching Authority in corresponding International Patent Application No. PCT/JP2020/012278, Jun. 23, 2020.
International Search Report with a Written Opinion issued by the International Searching Authority in corresponding International Patent Application No. PCT/JP2020/012279, Jun. 23, 2020.
International Search Report with a Written Opinion issued by the International Searching Authority in corresponding International Patent Application No. PCT/JP2020/012280, Jul. 7, 2020.
International Search Report with a Written Opinion issued by the International Searching Authority in corresponding International Patent Application No. PCT/JP2020/012281, Jun. 23, 2020.
Extended European Search Report issued in corresponding European Patent Application No. 20710757.4, Aug. 2, 2021.
Extended European Search Report issued in corresponding European Patent Application No. 20710756.6, Oct. 21, 2021.
Office Action (Notice of Reasons for Refusal) issued in corresponding Japanese Patent Application No. 2019-058549, Feb. 21, 2023.
Notification of First Office Action with Search Report issued in corresponding Chinese Patent Application No. 202080023200.2, Sep. 27, 2023.
Office Action with Search Report issued in Chinese Patent Application No. 202080023316.6, Jan. 11, 2024.
Extended European Search Report issued in European Patent Application No. 20710758.2, Jul. 6, 2021.
Extended European Search Report issued in European Patent Application No. 20710755.8, Jul. 6, 2021.
Examination Report issued in Australian Patent Application No. 2020246265 on Mar. 22, 2022.
Examiner's Requisition issued in Canadian Patent Application No. 3,114,158, Apr. 27, 2022.

DEVELOPING CARTRIDGE HAVING A LEVER MOVABLE RELATIVE TO A CASING

CROSS-REFERENCE TO RELATED APPLICATION

This application is a continuation of Ser. No. 17/325,813 filed May 20, 2021, now U.S. Pat. No. 11,835,877, which is a continuation of Ser. No. 16/825,435, filed Mar. 20, 2020, now U.S. Pat. No. 11,022,931, which claims priority from Japanese Patent Application No. 2019-058549 filed on Mar. 26, 2019. The content of the aforementioned applications is incorporated herein by reference in its entirety.

TECHNICAL FIELD

The present disclosure relates to a developing cartridge.

BACKGROUND

Electro-photographic image forming apparatuses, such as laser printers and LED printers, have been developed. A developing cartridge is used in an image forming apparatus. The developing cartridge includes a developing roller for supplying a developer material.

The conventional developing cartridge 1 is mounted on a drum cartridge. The drum cartridge includes a photosensitive drum. When the developing cartridge is mounted on the drum cartridge, the photosensitive drum is brought into contact with the developing roller. Thereafter, the drum cartridge having the developing cartridge mounted therein is mounted in the image forming apparatus.

SUMMARY

The developing cartridge includes a member for positioning the developing roller relative to the photosensitive drum. The developing cartridge further includes a developing electrode for supplying a bias voltage to a shaft of the developing roller. Still furthermore, the developing cartridge includes a member that receives a pressing force when separating the developing roller from the photosensitive drum. However, if the member for positioning the developing roller, the developing electrode for supplying a bias voltage to the shaft of the developing roller, and the member for receiving a pressing force at the time of separation are separately provided, the number of parts in the developing cartridge increases.

Accordingly, the object of the present disclosure is to provide a structure capable of reducing the number of parts in a developing cartridge.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Embodiments of the present disclosure are described below with reference to the accompanying drawings.

Hereinafter, the direction in which a developing roller 30 of a developing cartridge 1 extends is referred to as a "first direction". In addition, the direction between which an agitator 20 and the developing roller 30 of the developing cartridge 1 are arranged is referred to as a "second direction". The first direction and the second direction cross (preferably, orthogonally cross) each other.

1. Overview of Developer Cartridge and Drum Cartridge

Figure 1:
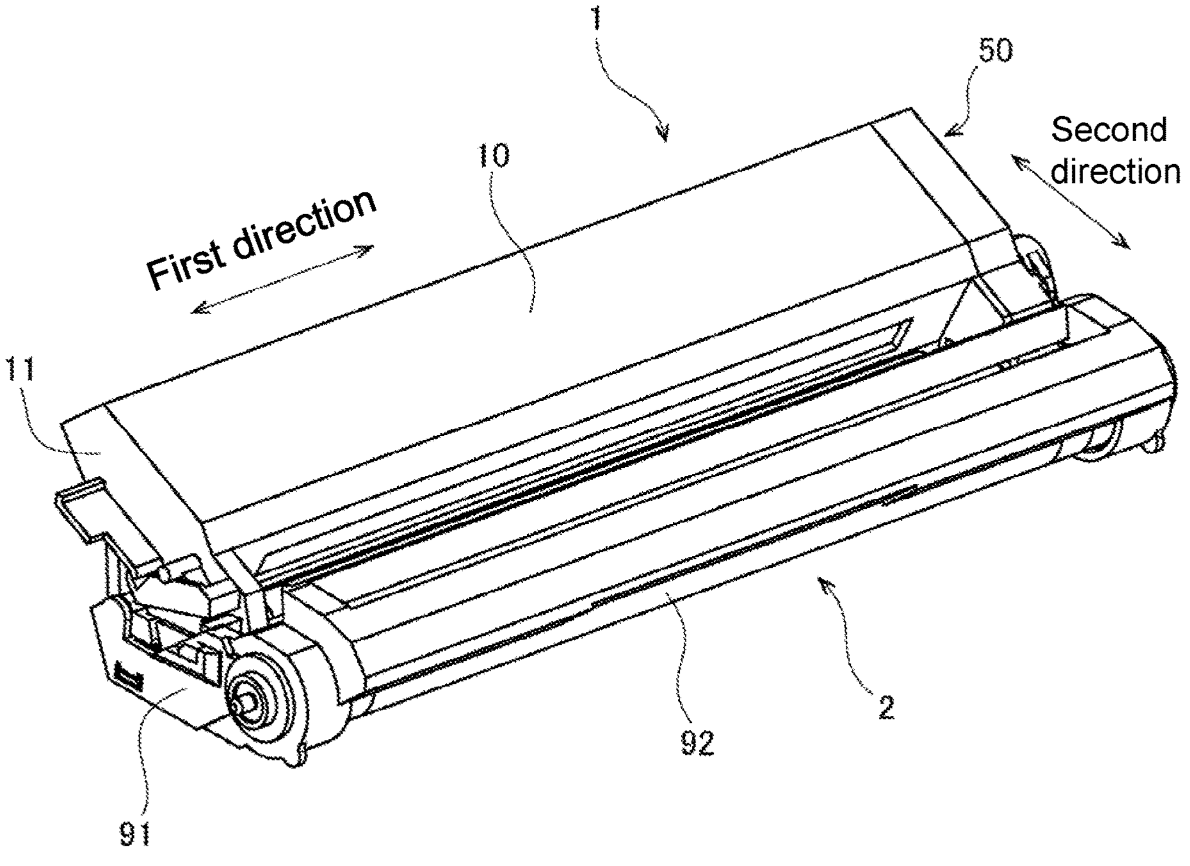
FIG. 1 is a perspective view of a developing cartridge and a drum cartridge in a first embodiment.

FIG. 1 is a perspective view of the developing cartridge 1 and the drum cartridge 2. In FIG. 1, the developing cartridge 1 is mounted on the drum cartridge 2. The developing cartridge 1 and the drum cartridge 2 are used in an electro-photographic image forming apparatus. An example of the image forming apparatus is a laser printer or an LED printer.

As illustrated in FIG. 1, the developing cartridge 1 is used together with the drum cartridge 2. The developing cartridge 1 is mountable on the drum cartridge 2. The developing cartridge 1 is mounted on the drum cartridge 2 and, thereafter, is mounted in the image forming apparatus. The image forming apparatus allows, for example, four developing cartridges 1 to be mounted therein. The four developing cartridges 1 contain developer materials (for example, toner) of different colors (for example, cyan, magenta, yellow, and black). The image forming apparatus forms an image on a recording surface of print paper by using the developer materials supplied from the developing cartridges 1. Note that the number of developing cartridges 1 mountable in the image forming apparatus may be one or more and so, in addition to being four, may be one to three, or five or more.

2. Information about Developing Cartridge

Figure 2:
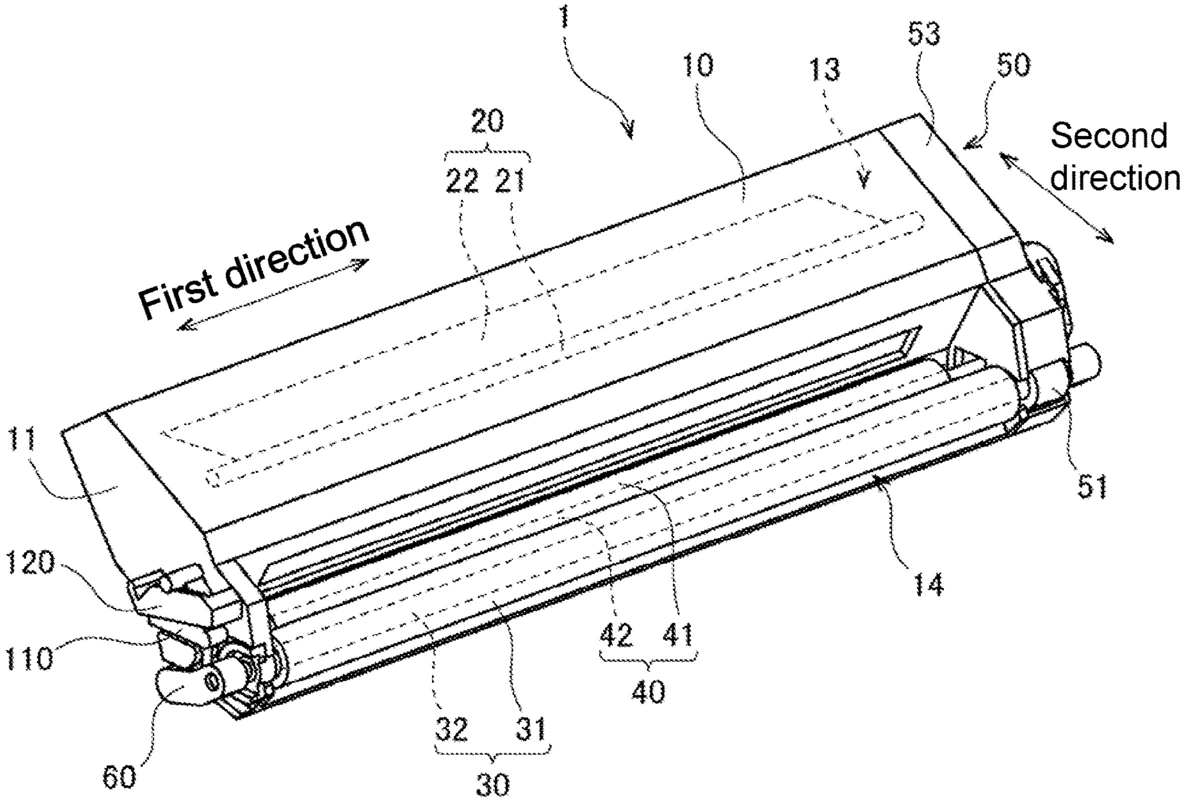
FIG. 2 is a perspective view of the developing cartridge in the first embodiment.
Figure 3:
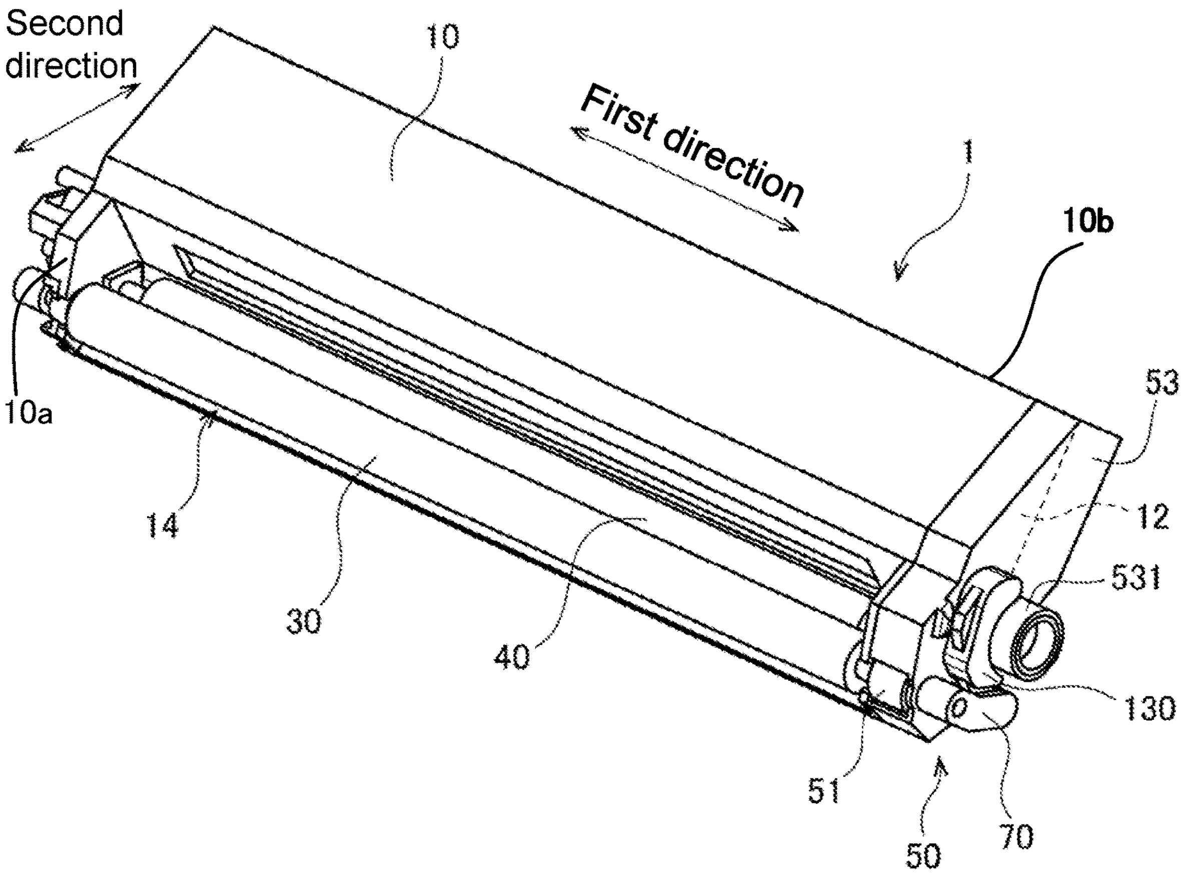
FIG. 3 is a perspective view of the developing cartridge in the first embodiment.
Figure 4:
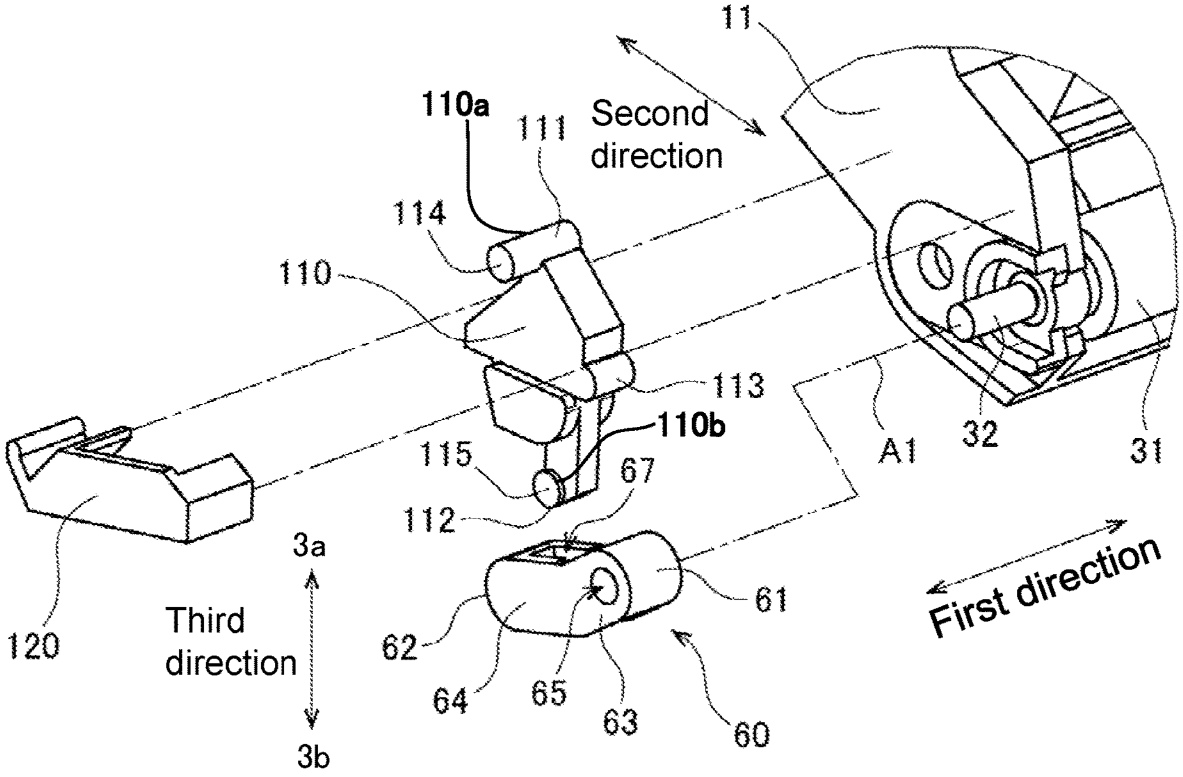
FIG. 4 is an exploded perspective view of a portion of the developing cartridge in the vicinity of a first outer surface of a casing in the first embodiment.
Figure 5:
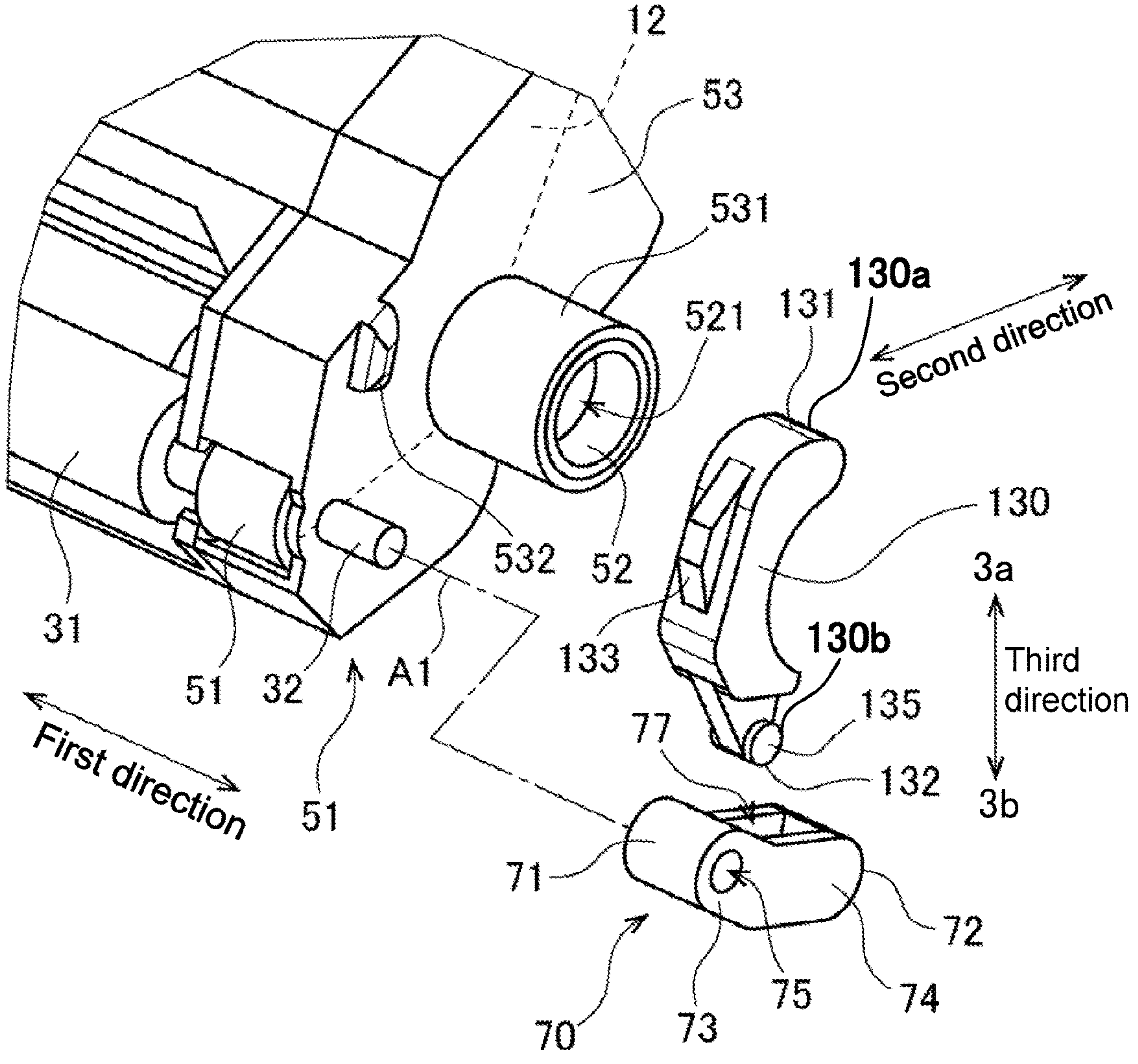
FIG. 5 is an exploded perspective view of a portion of the developing cartridge in the vicinity of a second outer surface of the casing in the first embodiment.

FIGS. 2 and 3 are perspective views of the developing cartridge 1. FIG. 4 is a view of the developing cartridge 1, in particular an exploded perspective view in the vicinity of a first outer surface 11 of a casing 10. FIG. 5 is a view of the developing cartridge 1, in particular an exploded perspective view in the vicinity of a second outer surface 12 of the casing 10. As illustrated in FIGS. 1 to 5, the developing cartridge 1 includes the casing 10, the agitator 20, the developing roller 30, a supply roller 40, a gear unit 50, a first bearing (otherwise described as a “developing electrode”, or “member”) 60, a first lever 110, a holder 120, a second bearing 70, and a second lever 130.

The casing 10 is a casing capable of containing a developer material. The casing 10 has a first outer surface 11 and a second outer surface 12. The first outer surface 11 is located at one end of the casing 10 in the first direction. The second outer surface 12 is located at the other end of the casing 10 in the first direction. The first outer surface 11 and the second outer surface 12 are separated from each other in the first direction. The casing 10 extends in the first direction between the first outer surface 11 and the second outer surface 12. In addition, the casing 10 extends in the second direction.

The casing 10 has an accommodation chamber 13 provided thereinside. The developer material is stored in the accommodation chamber 13. In addition, the casing 10 has an opening 14. The opening 14 is located at one end 10*a* of the casing 10 in the second direction. The outside of the casing 10, in other words the external space, and the accommodation chamber 13 of the casing 10 communicate with each other through the opening 14. Note that the casing 10 may have a handle on the outer surface at the other end 10*b* in the second direction.

The agitator 20 includes an agitator shaft 21 and a blade 22. The agitator shaft 21 extends in the first direction. The blade 22 extends or expands from the agitator shaft 21 toward the inner surface of the casing 10. The blade 22 and part of the agitator shaft 21 are disposed in the accommodation chamber 13 of the casing 10. An agitator gear (not illustrated) included in the gear unit 50 is attached to one end of the agitator shaft 21 in the first direction. The agitator shaft 21 is fixed to the agitator gear so as not to rotate relative to the agitator gear. When the agitator gear rotates, the agitator shaft 21 and the blade 22 rotate about the rotation axis extending in the first direction. Thus, the developer material is agitated in the accommodation chamber 13 by the blade 22 that is rotating.

The developing roller 30 is a roller that can rotate about a rotation axis A1 extending in the first direction. The developing roller 30 is located in the opening 14 of the casing 10. That is, the developing roller 30 is located at the one end of the casing 10 in the second direction. The developing roller 30 includes a developing roller main body 31 and a developing roller shaft 32. The developing roller main body 31 is a cylindrical member extending in the first direction. As the material used for the developing roller main body 31, rubber having resilience is used, for example. The developing roller shaft 32 is a cylindrical member that extends in the first direction and passes completely through the developing roller main body 31. The developing roller shaft 32 is electrically conductive. For the material of the developing roller shaft 32, metal or resin having electrical conductivity is used.

The developing roller main body 31 is fixed to the developing roller shaft 32 so as not to rotate relative to the developing roller shaft 32. Furthermore, a developing roller gear 51 included in the gear unit 50 is attached to an end portion of the developing roller shaft 32 in the first direction. The developing roller shaft 32 is fixed to the developing roller gear 51 so as not to rotate relative to the developing roller gear 51. Accordingly, when the developing roller gear

51 rotates, the developing roller shaft 32 rotates, and the developing roller main body 31 also rotates together with the developing roller shaft 32.

Note that the developing roller shaft 32 need not pass completely through the developing roller main body 31 in the first direction. For example, the developing roller shaft 32 may comprise two respective parts that extend in the first direction from both ends of the developing roller main body 31 in the first direction.

The supply roller 40 is a roller that is rotatable about a rotation axis extending in the first direction. The supply roller 40 is located between the agitator 20 and the developing roller 30. The supply roller 40 includes a supply roller main body 41 and a supply roller shaft 42. The supply roller main body 41 is a cylindrical member extending in the first direction. As the material used for the supply roller main body 41, rubber having resilience is used, for example. The supply roller shaft 42 is a columnar member extending in the first direction so as to pass completely through the supply roller main body 41.

The supply roller main body 41 is fixed to the supply roller shaft 42 so as not to rotate relative to the supply roller shaft 42. In addition, a supply roller gear (not illustrated) included in the gear unit 50 is attached to an end of the supply roller shaft 42 in the first direction. The supply roller shaft 42 is fixed to the supply roller gear so as not to rotate relative to the supply roller gear. Consequently, when the supply roller gear rotates, the supply roller shaft 42 also rotates and, thus, the supply roller main body 41 also rotates together with the supply roller shaft 42.

Note that the supply roller shaft 42 need not pass completely through the supply roller main body 41 in the first direction. For example, the supply roller shaft 42 may comprise two respective parts that extend in the first direction from both ends of the supply roller main body 41 in the first direction.

When the developing cartridge 1 receives the driving force, the developer material is supplied from the accommodation chamber 13 in the casing 10 to the outer peripheral surface of the developing roller 30 via the supply roller 40. At this time, the developer material is triboelectrically charged between the supply roller 40 and the developing roller 30. In addition, a bias voltage is applied to the developing roller shaft 32 of the developing roller 30. For this reason, the developer material is attracted to the outer peripheral surface of the developing roller main body 31 by the electrostatic force between the developing roller shaft 32 and the developer material.

Furthermore, the developing cartridge 1 includes a layer thickness regulation blade (not illustrated). The layer thickness regulation blade shapes the developer material supplied onto the outer peripheral surface of the developing roller main body 31 into a predetermined thickness. Thereafter, the developer material on the outer peripheral surface of the developing roller main body 31 is supplied to a photosensitive drum 92 (described below) of the drum cartridge 2. At this time, the developer material moves from the developing roller main body 31 onto the photosensitive drum 92 in accordance with an electrostatic latent image formed on the outer peripheral surface of the photosensitive drum 92. In this manner, the electrostatic latent image is visualized on the outer peripheral surface of the photosensitive drum 92.

The gear unit 50 is located the second outer surface 12 of the casing 10. As illustrated in FIG. 5, the gear unit 50 includes the above-described agitator gear, developing roller gear 51, and supply roller gear, and a plurality of idle gears, a coupling 52, and a gear cover 53. The gear cover 53 and the casing 10 together constitute the overall casing of the developing cartridge 1. The gear cover 53 is fixed to the second outer surface 12 of the casing 10 by, for example, screwing. At least some of the plurality of gears are located between the second outer surface 12 and the gear cover 53.

The gear cover 53 includes a cylindrical collar 531 protruding in the first direction. The coupling 52 is housed inside the collar 531. The coupling 52 has an engagement portion 521 that is recessed in the first direction. The engagement portion 521 is exposed from the gear cover 53. When the developing cartridge 1 mounted on the drum cartridge 2 is mounted in an image forming apparatus having a drive shaft, the drive shaft of the image forming apparatus is connected to the engagement portion 521 of the coupling 52. Thus, the rotation of the drive shaft of the image forming apparatus is transmitted to the agitator gear, the plurality of idle gears, the developing roller gear 51, and the supply roller gear via the coupling 52.

The plurality of gears included in the gear unit 50 may transmit the rotational force by meshing of teeth or may transmit the rotational force by friction.

The first bearing 60 is located at the first outer surface 11 of the casing 10. The first bearing 60 rotatably supports one end portion of the developing roller shaft 32 in the first direction. As illustrated in FIG. 4, the first bearing 60 has a first end portion 61 and a second end portion 62. The second end portion 62 is farther away from the developing roller shaft 32 than the first end portion 61. In addition, the second end portion 62 is farther away in the second direction from the one end 10*a* of the casing 10 in the second direction than the first end portion 61 is to the one end 10*a* of the casing in the second direction. The first bearing 60 extends along the first outer surface 11 of the casing 10 between the first end portion 61 and the second end portion 62.

The first bearing 60 includes a first arm 63 and a second arm 64. The second arm 64 is farther away from the developing roller shaft 32 than the first arm 63. In addition, the second arm 64 is farther away from the one end 10*a* in the second direction of the casing 10 than the first arm 63 is to the one end 10*a* in the second direction. The first arm 63 has the first end portion 61 described above. The second arm 64 has the second end portion 62 described above. The first arm 63 extends along the first outer surface 11 of the casing 10, for example, linearly. The second arm 64 extends along the first outer surface 11 of the casing 10, for example, linearly. Note that the first arm 63 is at an angle to the second arm 64. The angle formed by the first arm 63 and the second arm 64 is an obtuse angle.

According to the present embodiment, the first arm 63 and the second arm 64 are integrally formed. However, the first arm 63 and the second arm 64 may be separate parts. In this case, the first arm 63 and the second arm 64 can be fixed to each other.

The first bearing 60 has a first insertion hole 65. The first insertion hole 65 extends in the first direction in the first end portion 61 of the first bearing 60. The first insertion hole 65 may be a through-hole passing through the first end portion 61 in the first direction. Alternatively, the first insertion hole 65 may be a hole that does not pass through the first end portion 61. The first insertion hole 65 has a cylindrical inner peripheral surface. One end portion of the developing roller shaft 32 in the first direction is inserted into the first insertion hole 65. In this manner, the first bearing 60 is attached to the one end portion of the developing roller shaft 32 in the first direction. Thus, the one end portion of the developing roller shaft 32 in the first direction is supported so as to be rotatable about a rotation axis A1 extending in the first direction. In addition, the first bearing 60 is rotatable about the developing roller shaft 32 with respect to the casing 10. More specifically, the second end portion 62 is pivotable about the rotation axis A1 with respect to the first end portion 61.

The first bearing 60 serves as an electrically conductive member which, because it provides electrical connection to the developing roller shaft 32, is described herein as a developing electrode. The first bearing 60 is made of, for example, a conductive resin. However, the first bearing 60 may be made of metal. The first end portion 61 of the first bearing 60 is in contact with the one end portion of the developing roller shaft 32 in the first direction. Consequently, the first end portion 61 of the first bearing 60 is electrically connected to the developing roller shaft 32.

In addition, the first bearing 60 has a first hole 67. The first hole 67 is located in the second direction between the first end portion 61 and the second end portion 62. Furthermore, the first hole 67 passes completely through the first bearing 60 in a pivotal direction about the rotation axis A1. However, the first hole 67 need not pass completely through the first bearing 60. The other end portion 112 of the first lever 110 (described below) is inserted into the first hole 67.

The first lever 110 is located at the first outer surface 11 of the casing 10. As illustrated in FIG. 4, the first lever 110 has one end portion 111, the other end portion 112, and a portion 113 having a pivot surface and configured to function as a pivot point 113, the portion 113 having the form/shape of a cam and herein referred to as a cam surface 113. The one end portion 111 is located at one end 110*a* of the first lever 110 in a third direction crossing the first direction and the second direction. The other end portion 112 is located at the other end 110*b* of the first lever 110 in the third direction. The cam surface 113 is located between the one end portion 111 and the other end portion 112 in the third direction. In addition, the one end portion 111 of the first lever 110 includes a first protruding portion 114 herein referred to as a first convex portion 114. The first convex portion 114 protrudes from the one end portion 111 of the first lever 110 in the first direction. The other end portion 112 of the first lever 110 includes a second protruding portion 115 herein referred to as a second convex portion 115. The second convex portion 115 protrudes from the other end portion 112 of the first lever 110 in the first direction.

The first lever 110 is movable relative to the casing 10. When the developing cartridge 1 is being mounted on the drum cartridge 2, the cam surface 113 can be brought into contact with a drum frame 91 (described below) of the drum cartridge 2. The first lever 110 is pivotable about the cam surface 113 between a first position and a second position.

The other end portion 112 of the first lever 110 is inserted into the first hole 67 of the first bearing 60. In addition, the other end portion 112 of the first lever 110 engages with the inner surface of the first hole 67 of the first bearing 60. More specifically, the first bearing 60 has an engagement surface 69 (refer to FIG. 11) on the inner surface of the first hole 67. The engagement surface 69 and the second convex portion 115 of the first lever 110 face each other in the third direction. That is, the second convex portion 115 of the first lever 110 engages with the engagement surface 69 of the first bearing 60. As a result, the first lever 110 is prevented from coming off from the first bearing 60 to one side in the third direction. In addition, the pivot range of the first bearing 60 about the rotation axis A1 is restricted.

The holder 120 is located at the first outer surface 11 of the casing 10. The holder 120 is fixed to the first outer surface 11 of the casing 10 by, for example, screwing. A portion of the first lever 110 is located between the first outer surface 11 and the holder 120. The first convex portion 114 of the first lever 110 is located closer to the one side 3*a* in the third direction than the holder 120 is to the one side 3*a* in the third direction. The second convex portion 115 of the first lever 110 is located closer to the other side 3*b* of the holder 120 in the third direction than the holder 120 is to the other side 38 of the holder 120 in the third direction. The first convex portion 114 and the holder 120 face each other in the third direction. Thus, the first lever 110 is prevented from coming off the holder 120 toward the other side 3B in the third direction. That is, the holder 120 holds the first lever 110 such that the first lever 110 is movable with respect to the casing 10.

The second bearing 70 is located at the second outer surface 12 of the casing 10. More specifically, the second bearing 70 is located at the outer surface of the gear cover 53. The first bearing 60 and the second bearing 70 are located so as to overlap each other, as viewed in the first direction. The second bearing 70 rotatably supports the other end portion of the developing roller shaft 32 in the first direction. As illustrated in FIG. 5, the second bearing 70 has a third end portion 71 and a fourth end portion 72. The fourth end portion 72 is farther away from the developing roller shaft 32 than the third end portion 71. In addition, the fourth end portion 72 is farther away in the second direction from the one end 10*a* of the casing 10 in the second direction than the third end portion 71 is from the one end 10*a* of the casing 10 in the second direction. The second bearing 70 extends along the second outer surface 12 of the casing 10 between the third end portion 71 and the fourth end portion 72.

The second bearing 70 includes a third arm 73 and a fourth arm 74. The fourth arm 74 is farther away from the developing roller shaft 32 than the third arm 73. In addition, the fourth arm 74 is farther away in the second direction from the one end 10*a* of the casing 10 in the second direction than the third arm 73 is from the one end 10*a* of the casing 10 in the second direction. The third arm 73 has the third end portion 71 described above. The fourth arm 74 has the fourth end portion 72 described above. The third arm 73 extends along the second outer surface 12 of the casing 10, for example, linearly. The fourth arm 74 extends along the second outer surface 12 of the casing 10, for example, linearly. However, the third arm 73 is at an angle to the fourth arm 74. The angle formed by the third arm 73 and the fourth arm 74 is an obtuse angle.

According to the present embodiment, the third arm 73 and the fourth arm 74 are integrally formed. However, the third arm 73 and the fourth arm 74 may be separate parts. In this case, it is only required that the third arm 73 and the fourth arm 74 are fixed to each other.

The second bearing 70 has a second insertion hole 75. The second insertion hole 75 extends in the first direction in the third end portion 71 of the second bearing 70. The second insertion hole 75 may be a through-hole passing through the third end portion 71 in the first direction. Alternatively, the second insertion hole 75 may be a hole that does not pass through the third end portion 71. The second insertion hole 75 has a cylindrical inner circumferential surface. The other end portion of the developing roller shaft 32 in the first direction is inserted into the second insertion hole 75. In this manner, the second bearing 70 is attached to the other end portion of the developing roller shaft 32 in the first direction. Thus, the other end portion of the developing roller shaft 32 in the first direction is supported so as to be rotatable about a rotation axis A1 extending in the first direction. In addition, the second bearing 70 is also rotatable about the developing roller shaft 32 with respect to the casing 10. More specifically, the fourth end portion 72 is rotatable about the rotation axis A1 with respect to the third end portion 71.

In addition, the second bearing 70 has a third hole 77. The third hole 77 extends in the second direction between the third end portion 71 and the fourth end portion 72. Furthermore, the third hole 77 passes completely through the second bearing 70 in a pivotal direction about the rotation axis A1. However, the third hole 77 need not pass completely through the second bearing 70. The other end portion 132 of the second lever 130 (described below) is inserted into the third hole 77. The first hole 67 of the first bearing 60 and the third hole 77 of the second bearing 70 are located so as to overlap each other, as viewed in the first direction.

The second lever 130 is located at the second outer surface 12 of the casing 10. More specifically, the second bearing 70 is located at the outer surface of the gear cover 53. As illustrated in FIG. 5, the second lever 130 has one end portion 131, the other end portion 132, and a portion 133 having a pivot surface and configured to function as a pivot point 133, the portion 133 having the form/shape of a cam and herein referred to as a cam surface 133. The one end portion 131 is located at one end 130*a* of the second lever 130 in the third direction. The other end portion 132 is located at the other end 130*b* of the second lever 130 in the third direction. The cam surface 133 is located between the one end portion 131 and the other end portion 132 in the third direction. Furthermore, the other end portion 132 of the second lever 130 includes a third protruding portion 135 herein referred to as a third convex portion 135. The third convex portion 135 protrudes from the other end portion 132 of the second lever 130 in the first direction.

The one end portion 111 of the first lever 110 and the one end portion 131 of the second lever 130 are located so as to overlap each other, as viewed in the first direction. The other end portion 112 of the first lever 110 and the other end portion 132 of the second lever 130 are located so as to overlap each other, as viewed in the first direction.

The second lever 130 is movable relative to the casing 10. When the developing cartridge 1 is being mounted on the drum cartridge 2, the cam surface 133 can be in contact with a drum frame 91 (described below) of the drum cartridge 2. The second lever 130 is pivotable with respect to the cam surface 133 between a third position and a fourth position.

The other end portion 132 of the second lever 130 is inserted into the third hole 77 of the second bearing 70. In addition, the other end portion 132 of the second lever 130 engages with the inner surface of the third hole 77 of the second bearing 70. More specifically, the second bearing 70 has an engagement surface (not illustrated) in the inner surface of the third hole 77. The engagement surface and the third convex portion 135 of the second lever 130 face each other in the third direction. That is, the third convex portion 135 of the second lever 130 engages with the engagement surface of the second bearing 70. As a result, the second lever 130 is prevented from coming off the second bearing 70 to the one side 3*a* in the third direction. Furthermore, the rotation range of the second bearing 70 about the rotation axis A1 is restricted.

As illustrated in FIG. 5, the gear cover 53 has a protrusion 532 protruding in the first direction and having a convex form/shape and herein referred to as a gear cover convex portion 532 protruding in the first direction. The second lever 130 is located between the collar 531 and the gear cover convex portion 532 of the gear cover 53 in the second direction. In this manner, the movement of the second lever 130 in the second direction is restricted. In addition, the second lever 130 extends in an arc along the outer peripheral surface of the collar 531 of the gear cover 53. A portion of the collar 531 is located between the one end portion 131 and the other end portion 132 of the second lever 130 in the third direction. In this manner, the movement of the second lever 130 in the third direction is restricted.

3. Structure of Drum Cartridge

As illustrated in FIG. 1, the drum cartridge 2 includes the drum frame 91 and the photosensitive drum 92. The developing cartridge 1 is mounted on the drum frame 91. The photosensitive drum 92 is a cylindrical drum which is rotatable about a rotation axis extending in the first direction. The outer peripheral surface of the photosensitive drum 92 is coated with a photosensitive material. The photosensitive drum 92 is located at one end of the drum frame 91 in the second direction. When the developing cartridge 1 is being mounted on the drum frame 91, the outer peripheral surface of the developing roller 30 is in contact with the outer peripheral surface of the photosensitive drum 92.

Figure 6:
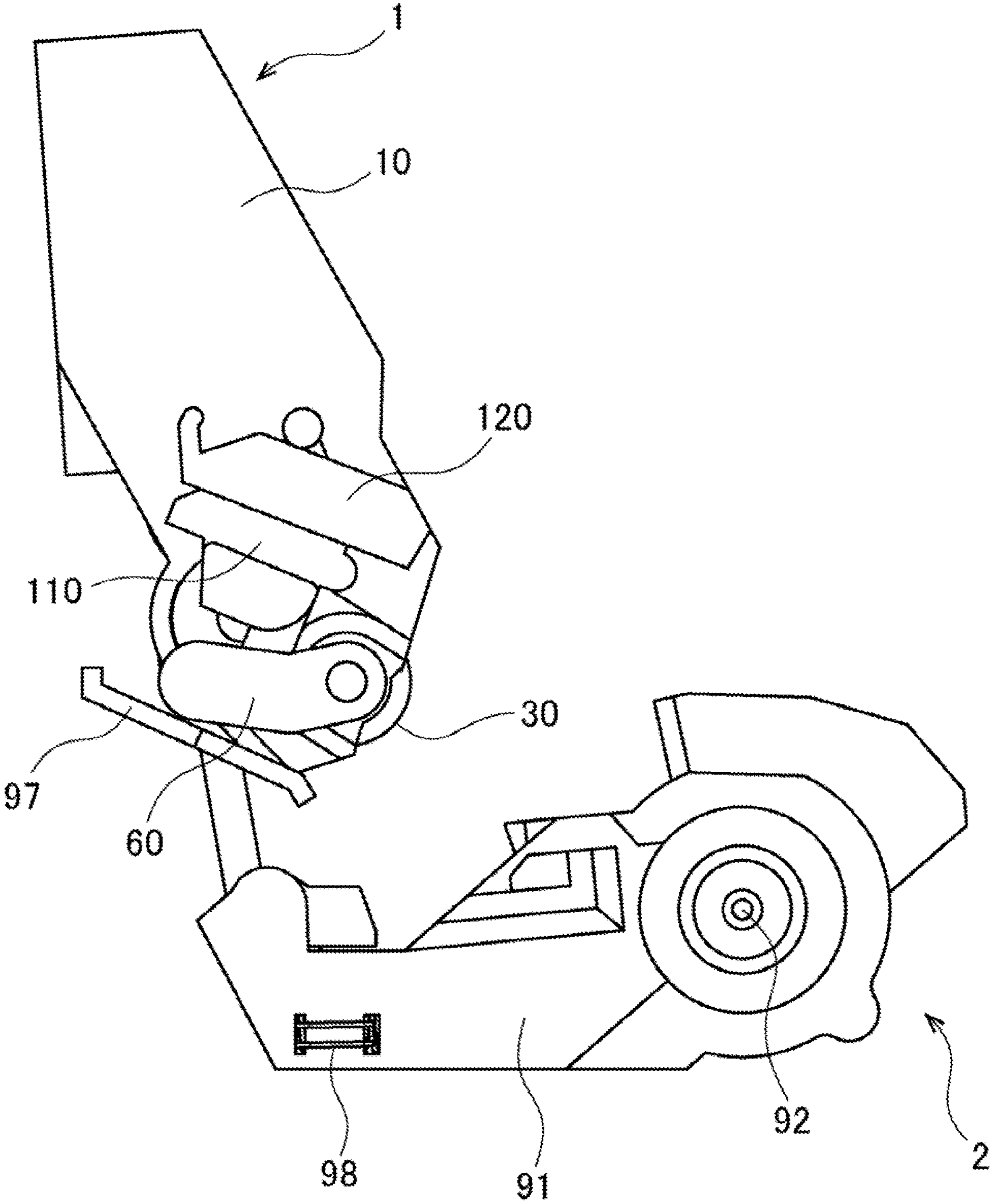
FIG. 6 is a view of the developing cartridge being mounted on the drum cartridge as viewed from one side of a first direction in the first embodiment.
Figure 7:
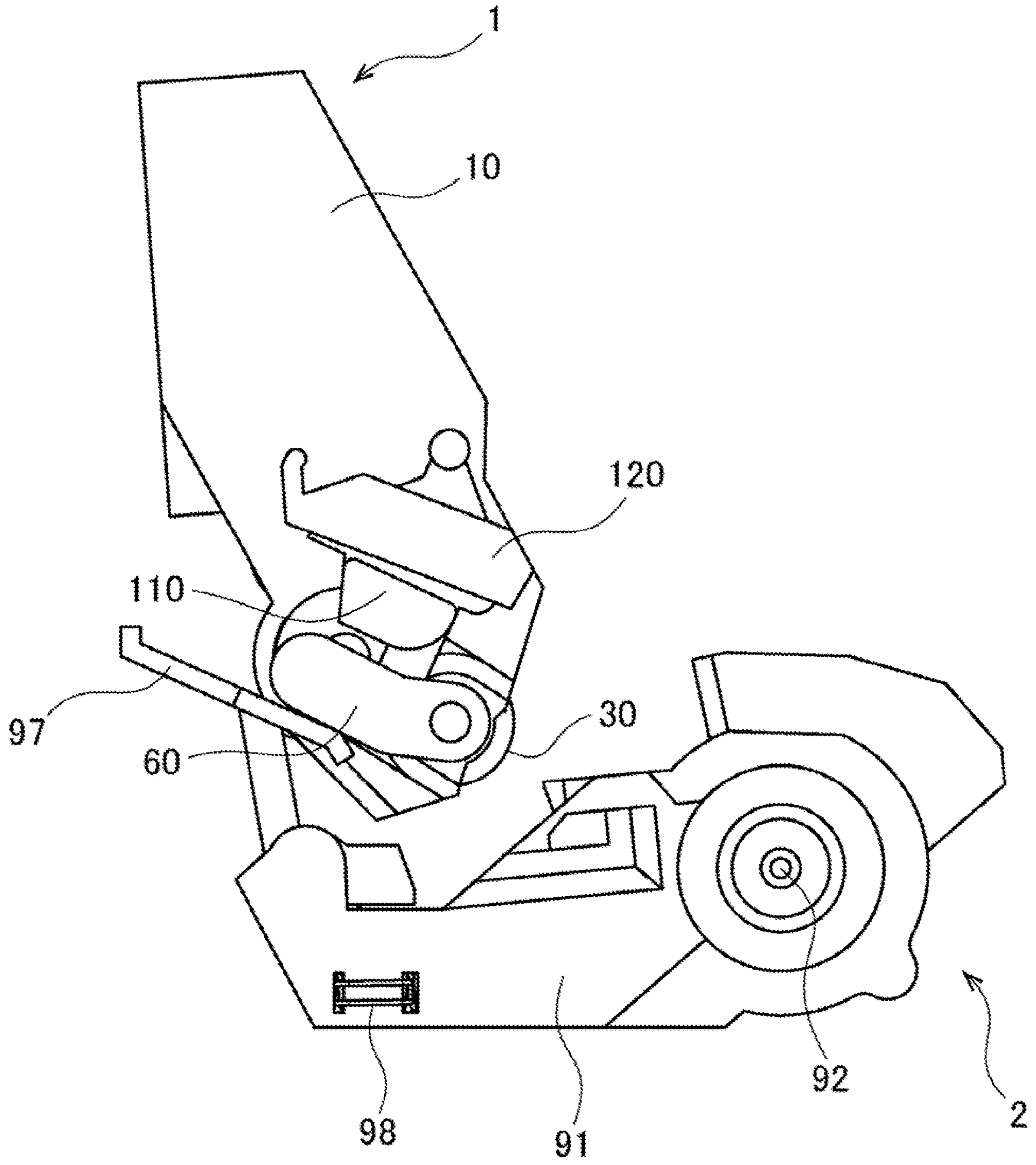
FIG. 7 is a view of the developing cartridge being mounted on the drum cartridge as viewed from the one side of the first direction in the first embodiment.
Figure 8:
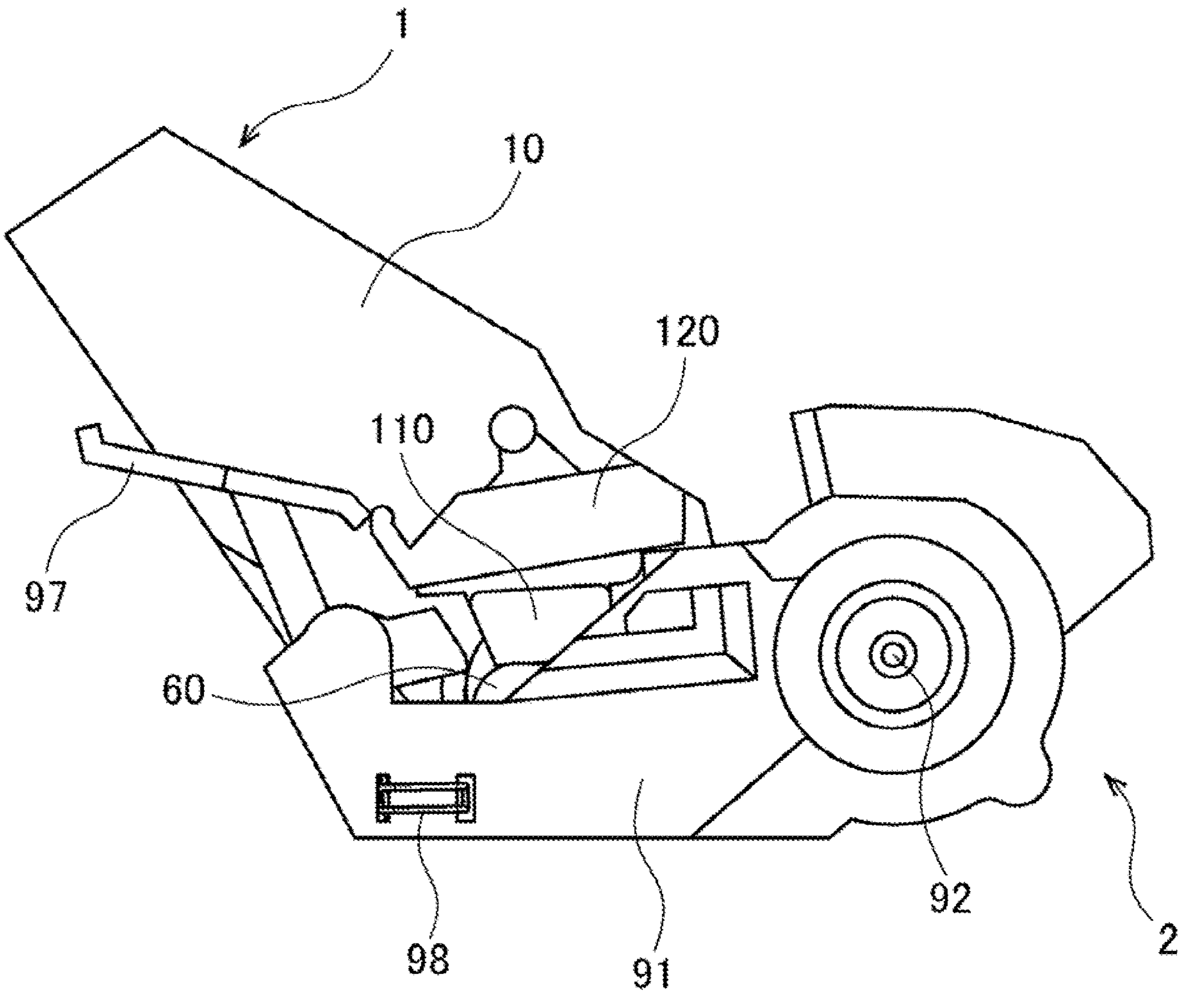
FIG. 8 is a view of the developing cartridge being mounted on the drum cartridge as viewed from the one side of the first direction in the first embodiment.
Figure 9:
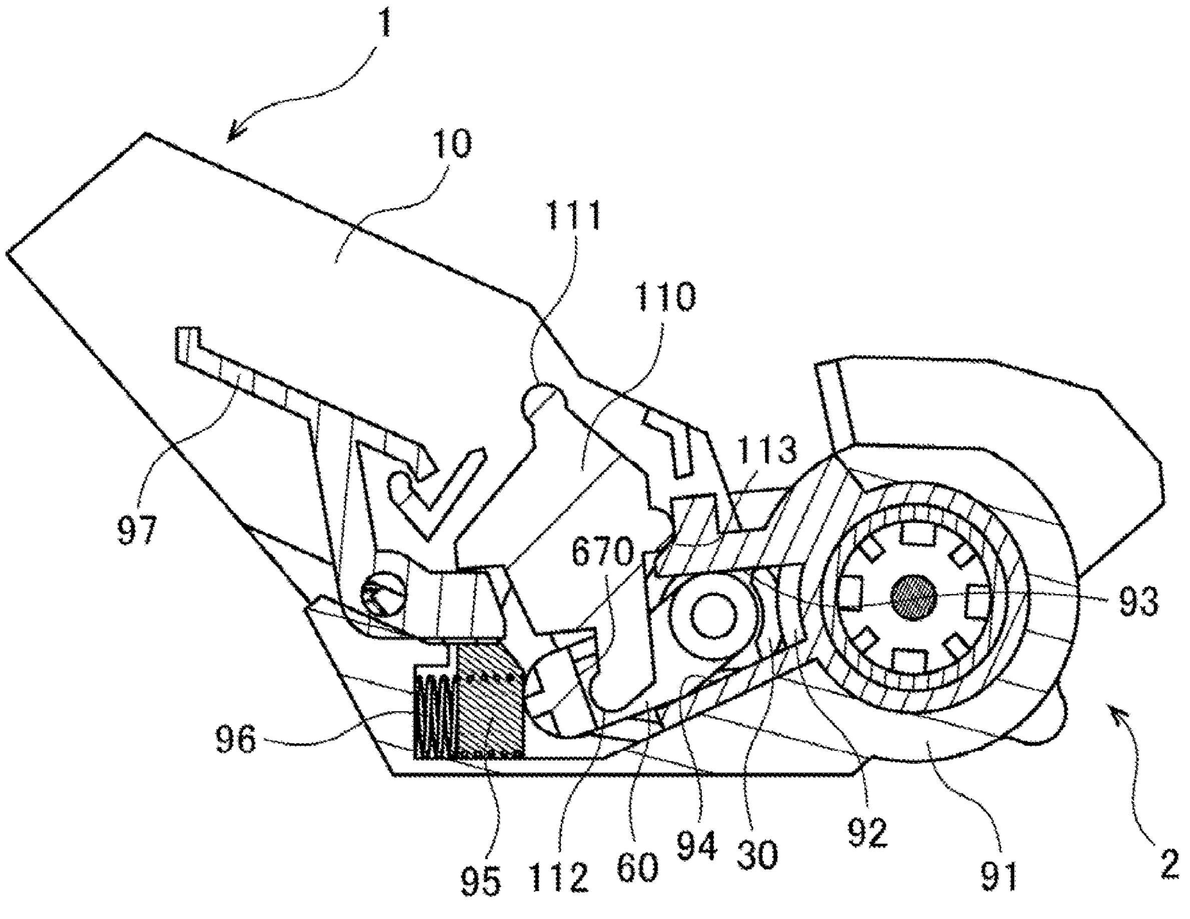
FIG. 9 is a cross-sectional view of the developing cartridge and the drum cartridge after the developing cartridge is mounted on the drum cartridge in the first embodiment.

FIGS. 6 to 8 are views of the developing cartridge 1 being mounted on the drum cartridge 2 as viewed from one side in the first direction. FIG. 9 is a cross-sectional view of the developing cartridge 1 and the drum cartridge 2 after the developing cartridge 1 is mounted on the drum cartridge 2. Note that FIG. 9 is a cross section that is orthogonal to the first direction and that passes completely through the first bearing 60 and the first lever 110.

As illustrated in FIG. 9, the drum cartridge 2 has a first guide surface 93 and a second guide surface 94. The first guide surface 93 and the second guide surface 94 are located at one end of the drum frame 91 in the first direction. In addition, the first guide surface 93 and the second guide surface 94 are separated in the rotational direction about the rotation axis of the photosensitive drum 92. Note that the drum cartridge 2 further has a third guide surface (not illustrated) and a fourth guide surface (not illustrated) that are similar to the first guide surface 93 and the second guide surface 94, respectively, at the other end of the drum frame 91 in the first direction.

Furthermore, as illustrated in FIG. 9, the drum cartridge 2 includes a first pressing member 95 and a first coil spring 96. The first pressing member 95 and the first coil spring 96 are electrically conductive. The first pressing member 95 is made of, for example, a conductive resin. The first coil spring 96 is made of, for example, metal. The first pressing member 95 and the first coil spring 96 are located at one end of the drum frame 91 in the first direction. The first coil spring 96 is a resilient member that can expand and contract in the second direction. One end of the first coil spring 96 in the second direction is connected to the first pressing member 95. The other end of the first coil spring 96 in the second direction is connected to the drum frame 91. When the developing cartridge 1 is mounted on the drum cartridge 2, the first pressing member 95 presses the second end portion 62 of the first bearing 60 toward the photosensitive drum 92 by the resilience force of the first coil spring 96.

In addition, the drum cartridge 2 includes a second pressing member (not illustrated) and a second coil spring (not illustrated). The second pressing member and the second coil spring are located at the other end 91B of the drum frame 91 in the first direction. When the developing cartridge 1 is mounted on the drum cartridge 2, the second pressing member presses the fourth end portion 72 of the second bearing 70 toward the photosensitive drum 92 by the resilience force of the second coil spring.

Note that instead of using the first coil spring 96 and the second coil spring, other types of resilient members may be used for the drum cartridge 2. For example, the drum cartridge 2 may be provided with a spring other than a coil spring (e.g., a torsion spring or a leaf spring), rubber, or the like) as the resilient member.

In addition, as illustrated in FIGS. 6 to 9, the drum cartridge 2 includes a first release lever 97. The first release lever 97 is located at the one end 91A of the drum frame 91 in the first direction. The first release lever 97 is pivotable about a shaft extending in the first direction. The drum cartridge 2 further includes a second release lever (not illustrated). The second release lever is located at the other end 91B in the first direction of the drum frame 91. The second release lever is pivotable about a rotation shaft extending in the first direction.

4. Information about Operation to Mount Development Cartridge

As illustrated in FIGS. 6 to 9, when the developing cartridge 1 is being mounted on the drum cartridge 2, the developing cartridge 1 is moved relative to the drum cartridge 2 so that the developing roller 30 moves close to the photosensitive drum 92. At this time, as illustrated in FIGS. 6 to 9, the second end portion 62 of the first bearing 60 is brought into contact with the first release lever 97 and moves along the first release lever 97. Accordingly, the first bearing 60 pivots about the rotation axis A1. Similarly, the third end portion 71 of the second bearing 70 is brought into contact with the second release lever and moves along the second release lever. Accordingly, the second bearing 70 pivots about the rotation axis A1.

As described above, when the developing cartridge 1 is being mounted on the drum cartridge 2, the first bearing 60 and the second bearing 70 pivot about the rotation axis A1 of the developing roller 30. As a result, without rotating the casing 10 with respect to the drum frame 91, the first bearing 60 can be placed between the photosensitive drum 92 and the first pressing member 95. In addition, the second bearing 70 can be placed between the photosensitive drum 92 and the second pressing member. Consequently, a user of the image forming apparatus can move the developing roller 30 close to the photosensitive drum 92 without performing the operation to rotate the casing 10.

When the first bearing 60 is placed between the photosensitive drum 92 and the first pressing member 95, the first pressing member 95 is in contact with the second end portion 62 of the first bearing 60. At this time, the first pressing member 95 presses the second end portion 62 of the first bearing 60 toward the photosensitive drum 92 by the resilience force of the first coil spring 96. Then, as illustrated in FIG. 9, the first end portion 61 of the first bearing 60 is brought into contact with the first guide surface 93, and the other portion of the first bearing 60 is brought into contact with the second guide surface 94. In this manner, the position of the first bearing 60 relative to the drum frame 91 is fixed.

Similarly, the second pressing member presses the fourth end portion 72 of the second bearing 70 toward the photosensitive drum 92. At this time, the third end portion 71 of the second bearing 70 is brought into contact with the third guide surface, and the other portion of the second bearing 70 is brought into contact with the fourth guide surface. In this manner, the position of the second bearing 70 relative to the drum frame 91 is fixed.

Furthermore, the first pressing member 95 presses the first bearing 60 with the positions of the first bearing 60 and the second bearing 70 relative to the drum frame 91 fixed. In addition, the second pressing member presses the second bearing 70. Thus, the outer peripheral surface of the developing roller 30 is brought into contact with the outer peripheral surface of the photosensitive drum 92. In this manner, the developing roller 30 is urged against the photosensitive drum 92.

As described above, according to the present embodiment, the first bearing 60 has the first end portion 61 and the second end portion 62, and the second end portion 62 is pivotable with respect to the first end portion 61. In addition, the second bearing 70 has the third end portion 71 and the fourth end portion 72, and the fourth end portion 72 is pivotable with respect to the third end portion 71. Consequently, the positioning of the developing roller 30 relative to the photosensitive drum 92 can be achieved by using the first end portion 61 and the second end portion 62 of the first bearing 60 and the third end portion 71 and the fourth end portion 72 of the second bearing 70.

Furthermore, according to the present embodiment, when the developing cartridge 1 is being mounted on the drum cartridge 2, the first bearing 60 and the second bearing 70 pivot about the rotation axis A1. In addition, when the developing cartridge 1 is being removed from the drum cartridge 2, the first bearing 60 and the second bearing 70 pivot about the rotation axis A1 in the same manner. For this reason, the developing cartridge 1 can be smoothly mounted on or removed from the drum cartridge 2 by causing the first bearing 60 and the second bearing 70 to pivot without rotating the casing 10.

5. Information about Supply of Voltage

The first pressing member 95 and the first coil spring 96 are electrically conductive. The first pressing member 95 is made of, for example, a conductive resin. The first coil spring 96 is made of, for example, metal. In addition, the drum cartridge 2 includes an electrode terminal 98 that is in electrical contact with the first coil spring 96. As illustrated in FIGS. 6 to 8, the electrode terminal 98 is exposed on the outer surface of the drum frame 91. Furthermore, as described above, the developing roller shaft 32 and the first bearing 60 are electrically conductive. For this reason, when the developing cartridge 1 is mounted on the drum cartridge 2 and, thus, the first pressing member 95 is brought into contact with the first bearing 60, the electrode terminal 98, the first coil spring 96, the first pressing member 95, the first bearing 60, and the developing roller shaft 32 are electrically connected to one another.

When the developing cartridge 1 mounted on the drum cartridge 2 is mounted in the image forming apparatus, the electrode terminal of the image forming apparatus is in contact with the electrode terminal 98 of the drum cartridge 2. Thus, a bias voltage is supplied from the image forming apparatus to the developing roller shaft 32 via the electrode terminal 98, the first coil spring 96, the first pressing member 95, and the first bearing 60. As a result, the developer material is attracted to the outer peripheral surface of the developing roller main body 31 by the electrostatic force generated by the bias voltage.

As described above, according to the present embodiment, the bias voltage is supplied to the first bearing 60 of the developing cartridge 1 via the first pressing member 95 of the drum cartridge 2. In this way, the number of parts of the drum cartridge 2 can be reduced as compared with the case where a conductive part for supplying a voltage to the first bearing 60 is provided separately from the first pressing member 95. Therefore, the size of the drum cartridge 2 can be reduced.

In addition, the first bearing 60 according to the present embodiment has (1) the capability of serving as a bearing for rotatably supporting the developing roller shaft 32 and (2) the capability of serving as a positioning member that determines the position of the developing roller 30 relative to the photosensitive drum 92 when the developing cartridge 1 is mounted on the drum cartridge 2 and (3) the capability of serving as a developing electrode for supplying a bias voltage to the developing roller shaft 32. For this reason, the number of parts in the developing cartridge 1 can be reduced as compared with the case where these capabilities are provided by using different members. In addition, the size of the developing cartridge 1 can be reduced.

6. Information about Separating Operation

After the developing cartridge 1 mounted on the drum cartridge 2 is mounted in the image forming apparatus, the developing cartridge 1 can perform a separating operation by the driving force supplied from the image forming apparatus. As used herein, the term "separating operation" refers to an operation to temporarily separate the developing roller 30 from the photosensitive drum 92. For example, when monochrome printing is performed in the image forming apparatus, the developing cartridges 1 of colors other than black perform the separating operation. Note that the developing cartridge 1 of black color may perform the separating operation.

As illustrated in FIG. 9, with the developing cartridge 1 mounted on the drum cartridge 2, the developing cartridge 1 is placed at a contact position at which the developing roller 30 is in contact with the photosensitive drum 92. At this time, the position of the first lever 110 is the first position. At the first position, the other end portion 112 of the first lever 110 is separated from the inner surface 670 of the first hole 67 of the first bearing 60. Consequently, the other end portion 112 of the first lever 110 does not press the inner surface 670 of the first hole 67. In addition, the cam surface 113 of the first lever 110 is in contact with the drum frame 91. Furthermore, the position of the second lever 130 at this time is the third position. At the third position, the other end portion 132 of the second lever 130 is separated from the inner surface of the third hole 77 of the second bearing 70. Consequently, the other end portion 132 of the second lever 130 does not press the inner surface of the third hole 77 of the second bearing 70. In addition, the cam surface 133 of the second lever 130 is in contact with the drum frame 91.

Figure 10:
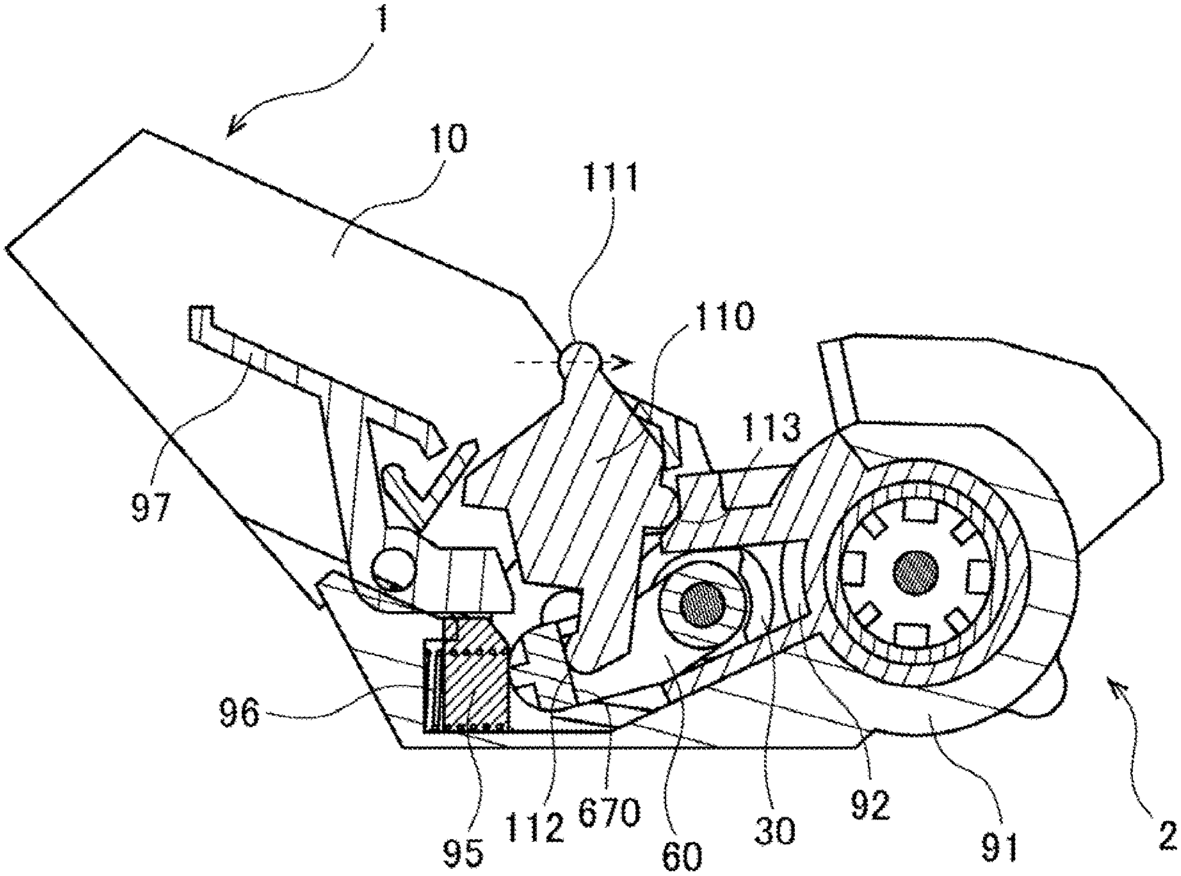
FIG. 10 is a cross-sectional view of the developing cartridge and the drum cartridge when the developing cartridge is in a separation operation in the first embodiment.

FIG. 10 is a cross-sectional view of the developing cartridge 1 and the drum cartridge 2 at the time of the separating operation. Note that FIG. 10 is the cross section that is orthogonal to the first direction and that passes completely through the first bearing 60 and the first lever 110.

The image forming apparatus applies a driving force to the one end portion 111 of the first lever 110 when the separating operation is performed. More specifically, the image forming apparatus operates a drive lever (not illustrated). Then, the drive lever presses the one end portion 111 of the first lever 110 as indicated by a broken arrow in FIG. 10. Thus, the first lever 110 pivots about the cam surface 133 from the first position to the second position. At this time, the other end portion 112 of the first lever 110 moves in a direction away from the photosensitive drum 92 and presses the inner surface 670 of the first hole 67 of the first bearing 60. More specifically, the other end portion 112 of the first lever 110 presses the second end portion 62 of the first bearing 60 in a direction away from the developing roller 30 against the pressing force of the first pressing member 95. As a result, the first bearing 60 moves in the direction away from the photosensitive drum 92 together with the other end portion 112 of the first lever 110.

In addition, the image forming apparatus applies a driving force to one end portion 131 of the second lever 130 when the separating operation is performed. More specifically, the image forming apparatus operates another drive lever (not illustrated). Then, the drive lever presses the one end portion 131 of the second lever 130. Thus, the second lever 130 pivots about the cam surface 133 from the third position to the fourth position. At this time, the other end portion 132 of the second lever 130 moves in the direction away from the photosensitive drum 92 and presses the inner surface of the third hole 77 of the second bearing 70. More specifically, the other end portion 132 of the second lever 130 presses the fourth end portion 72 of the second bearing 70 in a direction away from the developing roller 30 against the pressing force of the second pressing member. As a result, the second bearing 70 moves in the direction away from the photosensitive drum 92 together with the other end portion 132 of the second lever 130.

Thus, the casing 10 and the developing roller 30 move in the direction away from the photosensitive drum 92 together with the first bearing 60 and the second bearing 70. As a result, the outer peripheral surface of the developing roller 30 is separated from the outer peripheral surface of the photosensitive drum 92. That is, the developing cartridge 1 moves from the above-described contact position to the separated position with respect to the drum cartridge 2.

As described above, according to the present embodiment, the other end portion 112 of the first lever 110 presses the inner surface 670 of the first hole 67 of the first bearing 60 in accordance with the force that the one end portion 111 of the first lever 110 receives from the drive lever of the image forming apparatus. In this manner, the force can be applied to move the developing cartridge 1 from the contact position to the separated position. That is, the driving force applied by the image forming apparatus can be transmitted to the first bearing 60 by the first lever 110 having the one end portion 111 that functions as the point of effort, the other end portion 112 that functions as the point of application, and the cam surface 113 that functions as the pivot point.

Furthermore, the other end portion 132 of the second lever 130 presses the inner surface of the third hole 77 of the second bearing 70 in accordance with the force that the one end portion 131 of the second lever 130 receives from the drive lever of the image forming apparatus. In this manner, the force can be applied to move the developing cartridge 1 from the contact position to the separated position. That is, the driving force applied by the image forming apparatus can be transmitted to the second bearing 70 by the second lever 130 having the one end portion 131 that functions as the point of effort, the other end portion 132 that functions as the point of application, and the cam surface 133 that functions as the pivot point.

That is, the driving force supplied by the image forming apparatus is transmitted to the first bearing 60 and the second bearing 70 of the developing cartridge 1 without passing through the drum cartridge 2. In this manner, the need for providing, in the drum cartridge 2, a component that relays the driving force is eliminated. Consequently, the number of parts of the drum cartridge 2 can be reduced. As a result, the size of the drum cartridge 2 can be reduced.

In addition, in the developing cartridge 1, the one end portion 111 of the first lever 110 includes the first convex portion 114 that protrudes in the first direction. For this reason, the surface area of the one end portion 111 of the first lever 110 is wider than in the case where the first convex portion 114 is not provided. Therefore, at the time of the separating operation, the drive lever of the image forming apparatus can stably press the one end portion 111 of the first lever 110. In this manner, the separating operation performed in the image forming apparatus is stabilized. Note that like the first lever 110, the one end portion 131 of the second lever 130 may have a convex portion that protrudes in the first direction.

In addition, in the developing cartridge 1, the first bearing 60 and the second bearing 70 which support the developing roller shaft 32 receive a pressing force at the time of the separating operation. Consequently, the number of parts in the developing cartridge 1 can be reduced as compared with the case where a member that receives a pressing force at the time of the separating operation is provided separately from the first bearing 60 and the second bearing 70. As a result, the size of the developing cartridge 1 can be reduced.

In addition, the first bearing 60 is pivotable about the rotation axis A1. Therefore, the first lever 110 can press the inner surface 670 of the first hole 67 of the first bearing 60 in an optimum direction. Similarly, the second bearing 70 is pivotable about the rotation axis A1. Therefore, the second lever 130 can press the inner surface of the third hole 77 of the second bearing 70 in an optimum direction.

In addition, when the developing cartridge 1 moves from the contact position to the separated position, the first bearing 60 moves along the second guide surface 94. Furthermore, the second bearing 70 moves along the fourth guide surface. In this manner, the first lever 110 can press the first bearing 60 while maintaining the position of the first bearing 60 relative to the rotation axis A1 serving as the central point. Furthermore, the second lever 130 can press the second bearing 70 while maintaining the position of the second bearing 70 relative to the rotation axis A1 serving as the central point.

7. Operation to Remove Developing Cartridge

Figure 11:
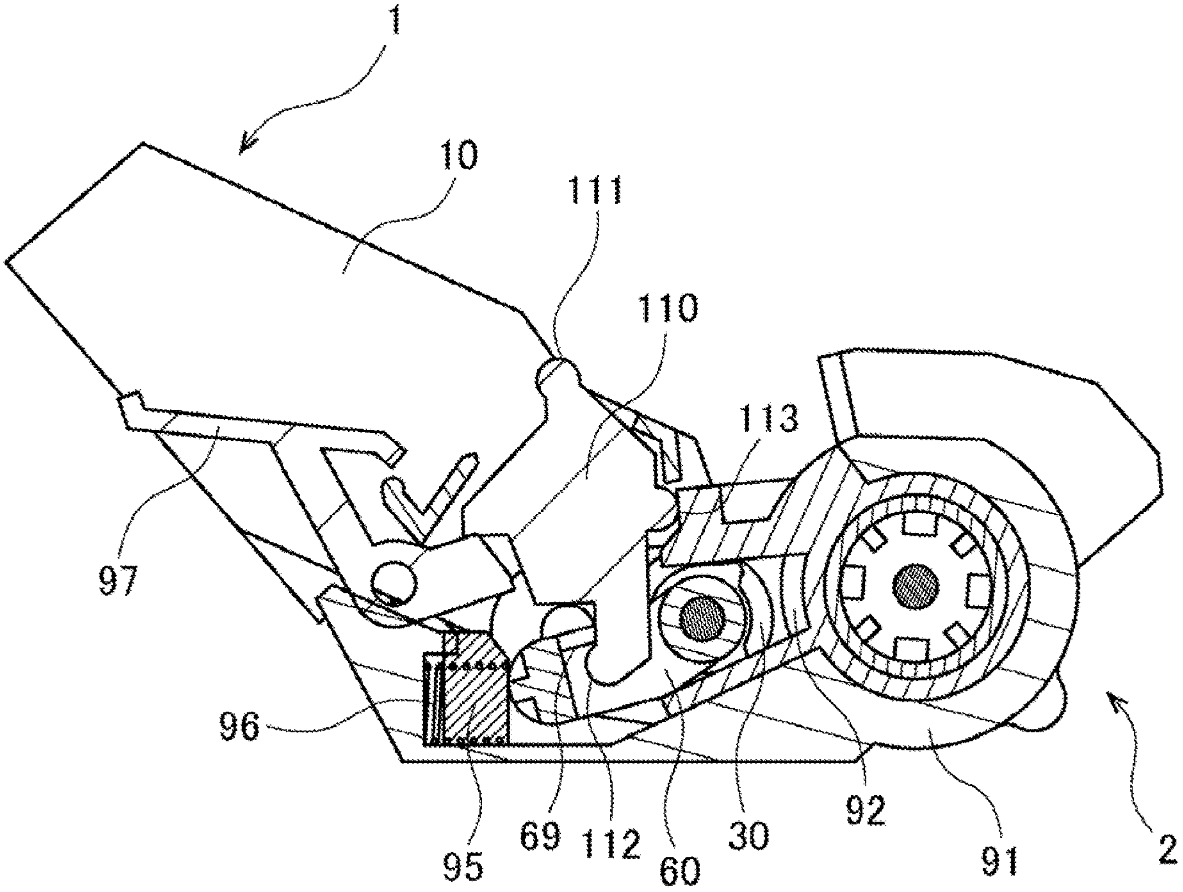
FIG. 11 is a cross-sectional view of the developing cartridge and the drum cartridge when the developing cartridge is removed from the drum cartridge in the first embodiment.

FIG. 11 is a cross-sectional view of the developing cartridge 1 and the drum cartridge 2 when the developing cartridge 1 is to be removed from the drum cartridge 2. FIG. 11 is the cross section that is orthogonal to the first direction and that passes completely through the first bearing 60 and the first lever 110.

When removing the developing cartridge 1 from the drum cartridge 2, the user presses the first release lever 97 and the second release lever. Thus, the first release lever 97 and the second release lever pivot about an axis extending in the first direction. Then, the first release lever 97 presses the first lever 110 to the one side 3*a* in the third direction. In addition, the second release lever presses the second lever 130 to the one side 3*a* in the third direction. Furthermore, the other end portion 112 of the first lever 110 is brought into contact with the engagement surface 69 of the first bearing 60 and presses the engagement surface 69 to the one side 3*a* in the third direction. Still furthermore, the other end portion 132 of the second lever 130 is brought into contact with the engagement surface 79 of the second bearing 70 and presses an engagement surface 79 to the one side 3*a* in the third direction.

Accordingly, the first bearing 60 comes off from between the photosensitive drum 92 and the first pressing member 95 to the one side 3*a* in the third direction. In addition, the second bearing 70 comes off from between the photosensitive drum 92 and the second pressing member to the one side 3*a* in the third direction. As a result, the developing cartridge 1 can be removed from the drum cartridge 2.

8. Modifications

While an embodiment of the present disclosure has been described above, the present disclosure is not limited to the above-described embodiment. A variety of modifications are described below, focusing on differences between the modifications and the above-described embodiment.

According to the above-described embodiment, the developing cartridge 1 includes the first bearing and the second bearing. The first bearing and the second bearing have the same shape, and both are pivotable with respect to the casing 10. However, a second bearing may be provided having a shape that differs from that of the first bearing. In addition, a second bearing may be provided that is non-pivotable with respect to the casing 10. Furthermore, the developing cartridge 1 does not necessarily have to include the second bearing. In this case, the first bearing can be placed at either one of the ends of the casing 10 in the first direction.

According to the above-described embodiment, the developing cartridge 1 is mounted on the drum cartridge 2 including only one photosensitive drum 92. However, the developing cartridge 1 may be mounted on a drum cartridge including a plurality of photosensitive drums 92. Furthermore, the shape of the detail of the developing cartridge 1 may differ from the shape illustrated in any one of the drawings of the present application. In addition, the elements appearing in the above-described embodiment and modifications may be combined in any way as long as no conflicts occurs.

What is claimed is:

1. A developing cartridge comprising:

a casing capable of containing a developer material;

a lever movable relative to the casing between a first position and a second position, the lever including one end portion that functions as a point of effort, an other end portion that functions as a point of application, and a cam surface that functions as a pivot point, wherein the pivot point is not directly connected to the casing, and wherein, when the lever moves around the cam surface from the first position to the second position, the casing moves relative to the lever according to the movement of the lever.

2. The developing cartridge according to claim 1, wherein, when the lever moves around the cam surface serving as a central point from the first position to the second position in response to receipt of a driving force applied to the one end portion, the other end portion of the lever presses a portion of the casing in a direction opposite the developing roller.

3. The developing cartridge according to claim 2, wherein other end portion of the lever engages with an engagement surface of the portion of the casing.

4. The developing cartridge according to claim 1, wherein, when the lever is located at the first position, the other end portion of the lever does not press a portion of the casing, and wherein, when the lever is located at the second position, the other end portion of the lever presses the portion of the casing.

5. The developing cartridge according to claim 1, further comprising:

a holder configured to hold the lever in a movable manner relative to the casing.

6. The developing cartridge according to claim 1, wherein, when being moved from the first position to the second position, the lever moves around the cam surface serving as a central point with the cam surface in contact with a portion of a drum cartridge.

7. The developing cartridge according to claim 6, wherein the developing cartridge is mountable on the drum cartridge, wherein, when the lever is located at the first position with the developing cartridge mounted on the drum cartridge, a surface of the developing roller is in contact with a surface of the photosensitive drum, and wherein, when the lever is located at the second position with the developing cartridge mounted on the drum cartridge and the other end portion presses a portion of the casing, the surface of the developing roller is separated from the surface of a photosensitive drum.

8. The developing cartridge according to claim 6, wherein, the drum cartridge further includes a pressing member configured to press the developing roller toward the photosensitive drum with the developing cartridge mounted on the drum cartridge, and wherein the other end portion of the lever presses a portion of the casing against a pressing force of the pressing member.

9. The developing cartridge according to claim 1, wherein the one end portion of the lever includes a convex portion.

* * * * *